UNITED STATES PATENT OFFICE.

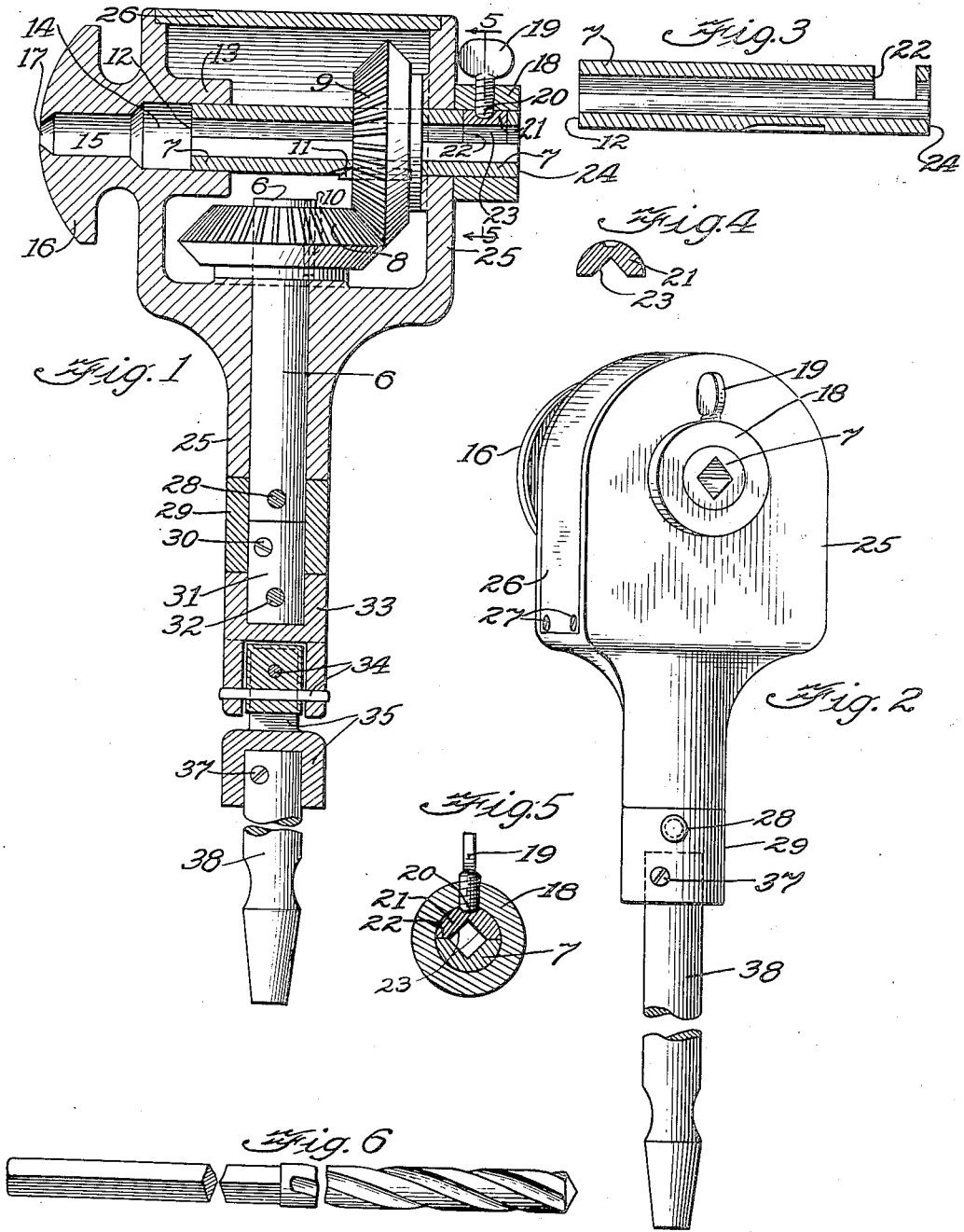

WILLIAM SCHULTZ, OF CHICAGO, ILLINOIS.

DRILLING DEVICE.

1,112,565.  Specification of Letters Patent.  Patented Oct. 6, 1914.

Application filed February 2, 1912. Serial No. 674,916.

*To all whom it may concern:*

Be it known that I, WILLIAM SCHULTZ, being a citizen of the United States, and a resident of the city of Chicago, county of Cook, and State of Illinois, have invented a certain new and useful Drilling Device, of which the following is a specification.

The object of this invention is to provide a convenient tool, especially adapted for use in connection with a hand-operated brace, for drilling or boring holes in corners and other places, inconvenient of direct access, such as are encountered with particular frequency in the repairing of railroad cars, and in similar work.

In the drawings Figure 1 is a sectional view of my device, in the plane of the axes of the operating shafts thereof, with the knuckle joint, hereinafter mentioned, in position; Fig. 2 is a perspective view of my device, without said knucklejoint; Fig. 3 is a sectional view, of the hollow shaft used in my device, in the same plane as that of Fig. 1: Fig. 4 is a sectional view of the clamping member used in connection with said hollow shaft; Fig. 5 is a sectional view in the plane of line 5—5 in Fig. 1, at right angles to the view shown in Fig. 1; and Fig. 6 is an elevation of a drill of the form preferably used in connection with my device.

Referring to the drawings, in frame 25 are mounted, at right angles to each other, solid shaft 6 and hollow shaft 7, carrying, respectively, beveled gearwheels 8 and 9 which are arranged so as to intermesh with each other, and are fixed in place on shafts 6 and 7 by keys 10 and 11, respectively. The inner end 12 of shaft 7 is mounted in a hollow boss 13 which is integral with frame 25 and whose hollow interior 14 connects with chamber 15, formed in direct line with the axis of shaft 7, in knob 16 which is formed integral with frame 25, in such manner as to constitute a convenient handle for holding my device to the work to be done. On the outer end 24 of shaft 7 is mounted collar 18 into which setscrew 19 is threaded so as to bear with its inner end 20 on member 21 which is formed so as to largely fill recess 22, formed, under collar 18, by cutting away a portion of shaft 7, as plainly shown in Fig. 3, enough play, however, being left for member 21 to make it practicable to force by means of setscrew 19, its inner faces 23 firmly against the shank of any drill which may be inserted into end 24 of shaft 7, the interior of said end 24 preferably being formed of square cross section, so as to fit the shanks of suitable drills, preferably constructed with shanks of square crosssection throughout, as shown in Fig. 6. The whole of shaft 7 being hollow, and chambers 14 and 15 being formed in direct elongation of the interior of shaft 7, it is plain that considerable room for longitudinal adjustment is allowed by my device for any such drill inserted in shaft 7. This is of considerable importance for the class of work for which my device is constructed. A curved shield 26, held in place by screws 27, threaded into frame 25, incloses, together with frame 25, gears 8 and 9, so as to make my device safe and convenient to handle. To the outer end of shaft 6 is attached, by means of rivet 28, one end of bushing 29, to the other end of which is connected, by means of setscrew 30, boss 31 which in turn is fastened by rivet 32, to forked member 33 of a knuckle joint constituted of member 33, pins 34, and forked member 35. To the outer end of member 35 is connected, by setscrew 37, shank 38 the free end of which is fashioned so as to fit the jaws of a common drilling brace. Boss 31 is made of the same dimensions as the end of shank 38 which enters member 35; and setscrew 30 is made of the same dimensions as setscrew 37. It is therefore practicable to connect shank 38 direct to bushing 29, leaving out the knucklejoint constituted of members 33, 34, 35 and 36, as illustrated in Fig. 2. It is plain that when assembled in the last mentioned manner, my device can conveneintly be used to reach many places inaccessible with ordinary hand operated drills, and that with the knucklejoint inserted between shank 38 and bushing 29, an even greater range of reach is secured.

The method of operation of my device will readily be understood from the foregoing description and the drawings by any one familiar with the use of drilling and boring tools, and detailed description of such method is therefore omitted.

I claim:—

In drilling devices a frame consisting of two parallel members connected to a base elongated into a stem, a hollow shaft mounted in said parallel members in the plane of said stem and at right angles to said stem; a shaft mounted in said stem in axial alinement therewith; intermeshing gears mounted on said shafts; cap extending from said base over the edges of said parallel members, and covering said gears; a hand knob on one of said members with an opening therein opposite to one end of the hollow shaft; means to fix a drill in the other end of said hollow shaft so as to be adjustable lengthwise; and means to connect the outer end of the other shaft to an operating means; substantially as and for the purpose described.

WILLIAM SCHULTZ.

Witnesses:
WM. A. VOSS,
NIC TESCHLER.